United States Patent [19]

Hikima et al.

[11] Patent Number: 5,297,113
[45] Date of Patent: Mar. 22, 1994

[54] JUMP OPERATION IN TWO-HEAD-TYPE VIDEO DISC PLAYER

[75] Inventors: Hiroshi Hikima; Takeo Tobe, both of Saitama, Japan

[73] Assignee: Pioneer Electronic Corporation, Tokyo, Japan

[21] Appl. No.: 953,269

[22] Filed: Sep. 30, 1992

[30] Foreign Application Priority Data

Nov. 8, 1991 [JP] Japan ................................. 3-293410

[51] Int. Cl.$^5$ ............................................. G11B 7/00
[52] U.S. Cl. ................................. 369/44.28; 369/32
[58] Field of Search ............... 369/44.28, 44.27, 44.11, 369/44.16, 44.26, 127, 53, 54, 58, 59, 43, 124, 100, 111; 360/78.04, 72.1, 66, 69, 19.1, 73.03; 358/319, 342, 147

[56] References Cited

U.S. PATENT DOCUMENTS 5,086,419  2/1992  Yanagi ................................. 369/32

Primary Examiner—Robert J. Pascal
Assistant Examiner—Ali Neyzari
Attorney, Agent, or Firm—Finnegan, Henderson, Farabow, Garrett & Dunner

[57] ABSTRACT

The reading position of a first reading head jumps when it is located in a vertical blanking period section of a video disc and the reading position of a second reading head jumps when it is located outside a predetermined portion of the vertical blanking period section in which a PCM audio signal is recorded. An output of the first reading head that is produced by reading sections other than the vertical blanking period section is employed as a video reading signal, and an output of the second reading head that is produced by reading the vertical blanking period section is employed as an audio reading signal.

2 Claims, 7 Drawing Sheets

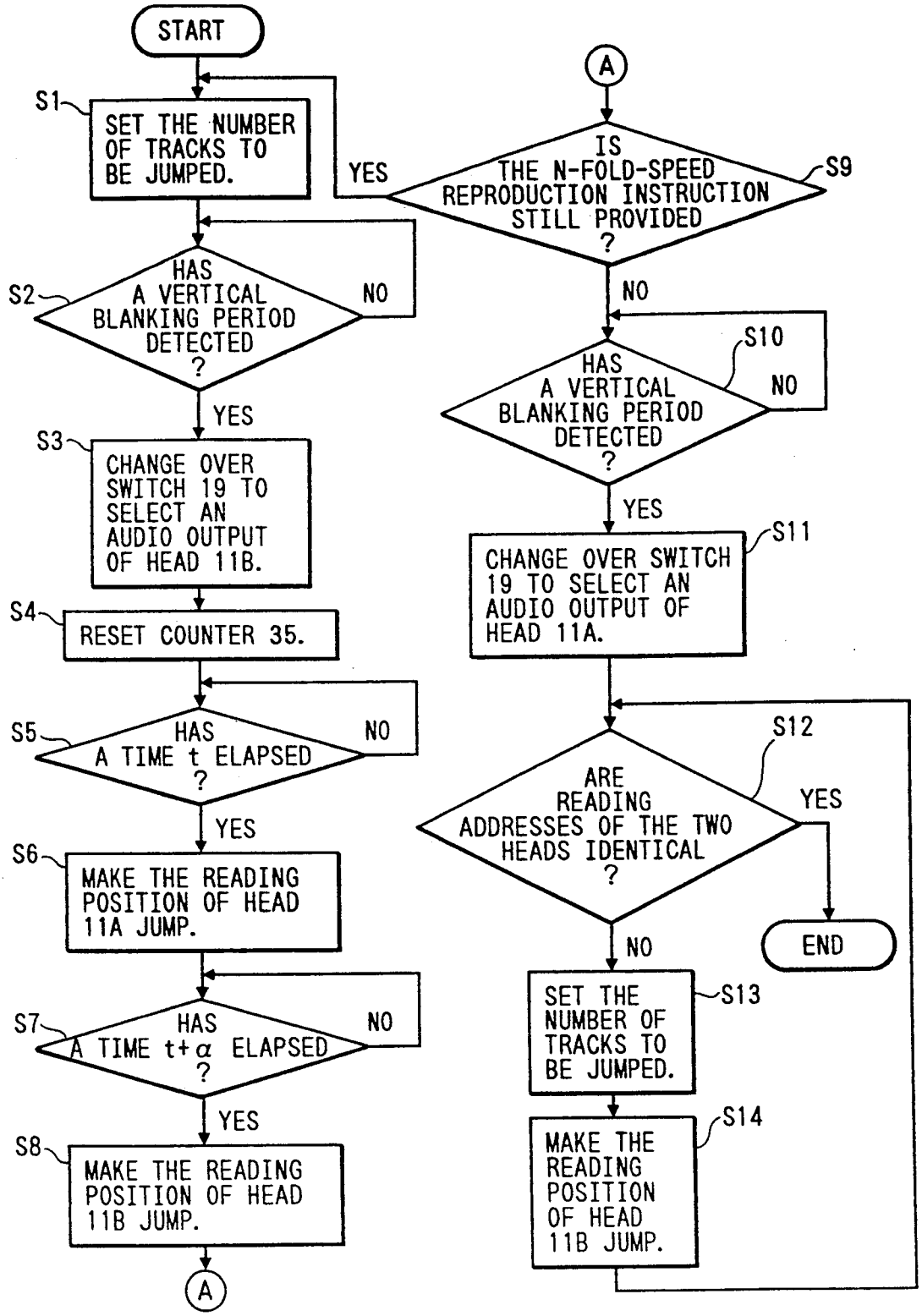

5,297,113

JUMP OPERATION IN TWO-HEAD-TYPE VIDEO DISC PLAYER

BACKGROUND OF THE INVENTION

The present invention relates to an information reading and reproducing method of a two-head-type disc player in its special operation modes that are accompanied by a jump operation.

There exist video discs on which a PCM audio signal is recorded so as to be inserted in the predetermined portion of the vertical blanking section. Special operation modes of a player for such types of discs include a pause operation, double-speed reproduction, search operation, etc. which need a jump operation. A user can activate these operations by his key board manipulation. In the case where one of these operations is activated, when the reading position of a reading head reaches a vertical blanking period, jumping of, e.g., one track is performed when it is located in the vertical blanking period section and the information reading for video reproduction is restarted from the jumping destination track. If the instruction for the same operation is still provided continuously, the jumping is again performed when the head reading position reaches the next vertical blanking period section. In this manner, the jump operation is repeatedly performed. However, the above player cannot reproduce the PCM audio signal because the PCM audio signal portion inserted in the vertical blanking period section cannot be read out from its beginning position in the above jump operation.

SUMMARY OF THE INVENTION

An object of the present invention is to provide an information reading and reproducing method of a disc player, which method enables reproduction of both of a video signal and a PCM audio signal during operation modes of a pause operation, double-speed reproduction, etc. which need a jump operation.

According to the invention, an information reading and reproducing method in a video disc player having first and second recording heads, for reading and reproducing a video signal and a PCM audio signal that is recorded in a predetermined portion of a vertical blanking period section of a video disc in an operation mode accompanied by a jump operation, comprises the steps of:

having a reading position of the first recording head jump when it is located in the vertical blanking section of the, and employing, as a video reading signal, an output of the first reading head that is produced by reading sections of the video disc other than the vertical blanking period section; and having a reading position of the second recording head jump when it is located outside the predetermined portion of the vertical blanking period section, and employing, as an audio reading signal, an output of the second reading head that is produced by reading the vertical blanking period section.

BRIEF DESCRIPTION OF THE DRAWINGS

FIG. 10 is a flowchart showing an operation performed by a microprocessor of the player of FIG. 1.

DESCRIPTION OF THE PREFERRED EMBODIMENT

An embodiment of the present invention is hereinafter described with reference to the accompanying drawings.

Figure 1:
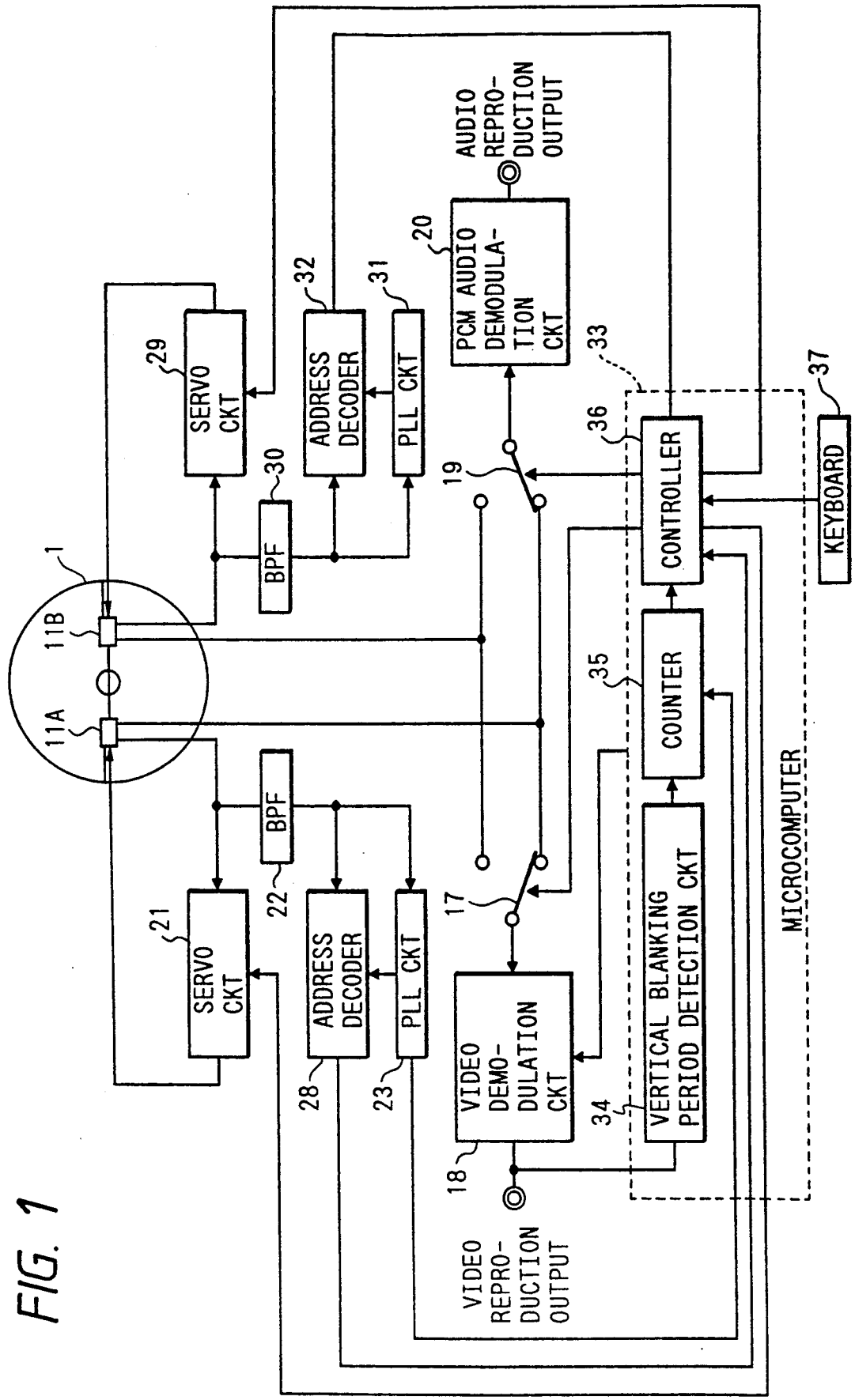
FIG. 1 is a block diagram showing a configuration of a video disc player according to the present invention.
Figure 2:
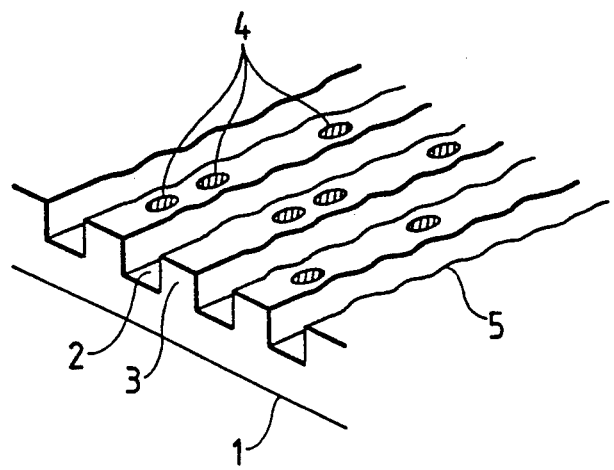
FIG. 2 is an enlarged perspective, partially sectional, view showing a recording surface of an optical disc.

FIG. 1 shows a disc player to which a video disc information reading and reproducing method of the invention is applied. A rewritable optical disc 1 is placed on a turn table (not shown) of the disc player. As shown in FIG. 2, pre-grooves 2 are formed on a recording surface of the disc 1. An information signal is recorded in the form of pits 4 that are produced by illuminating, with laser light (not shown), land portions 3, i.e., recording tracks that are formed between the pre-grooves 2. In the case of the magnetooptical disc, the pits 4 are formed in the form of inverted magnetization directions.

The wall 5 of the pre-groove 2 is undulated in the direction perpendicular to the track direction. Therefore, an address identification signal, i.e., a wobble signal of a high-frequency component generated from this undulation is superimposed on a tracking error signal of a low-frequency component. The address identification signal is incorporated in each unit information signal section called "sector" in accordance with a prescribed format.

Figure 3:
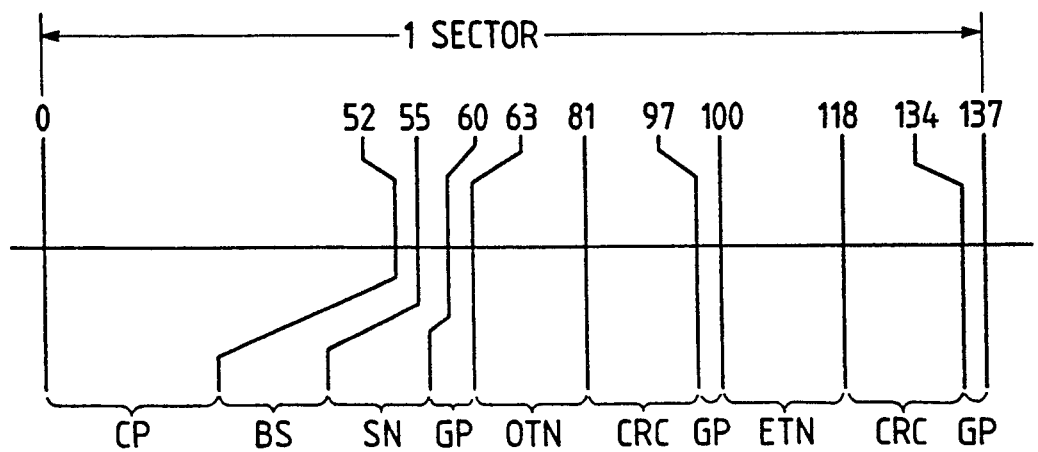
FIG. 3 shows a recording format of pre-grooves of the disc of FIG. 2.

As shown in FIG. 3, one sector consists of 137 bits. One track is divided into 25 sectors for some reasons, for instance, so that both NTSC and PAL video format signals can be recorded on the disc 1.

FIG. 3 shows a data arrangement format of sectors, among 25 sectors, that include a track number. In this format, a series of clock pulses is recorded one clock per bit in a clock pulse area CP of 52 bits (6.5 bytes), and serves as a PLL signal for the rotation servo of the disc 1 during the recording and reproducing operations. In the similar manner, a block sync signal of 3 bits is recorded in an area BS, and a sector number (0–24) of 5 bits is recorded in an area SN. Areas of 61–63rd bits, 98–100th bits and 135–137th bits are gap areas GP which are no-signal or undetermined waveform areas.

A 18-bit area OTN of 64–81st bits is an area for recording an odd track number, and another 18-bit area ETN of 119–134th bits is an area for recording an even track number. Error detection code pulses are recorded in two redundant bit areas CRC.

Figure 4:
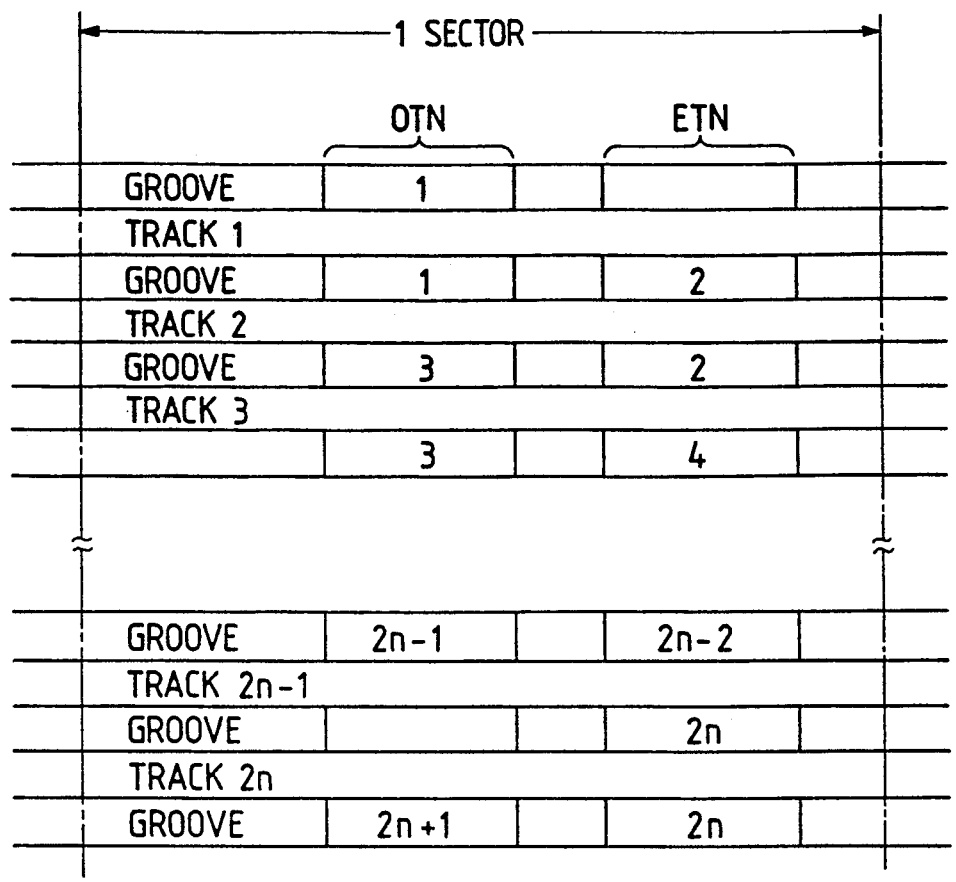
FIG. 4 shows how track numbers are recorded in accordance with the format of FIG. 3.

As shown in FIG. 4, in the case of track 1, the track number "1" is recorded in the area OTN of the pre-grooves on both sides of track 1, and no track number is recorded in the area ETN of the pre-groove on one side of track 1 and the track number "2" is recorded in the area ETN of the pre-groove on the other side of track 1. In the case of track 2, the track number "1" is recorded, as described above, in the area OTN of the pre-groove adjacent to track 1, and the track number "3" is recorded in the area OTN of the pre-groove on the opposite side. Further, the track number "2" is recorded in the area ETN of the pre-grooves on both sides of track 2. In this manner, the correct track number of odd track 2n-1 (n is a natural number) is a number recorded in the area OTN of the pre-grooves on both sides of that track. The correct track number of even track 2n is a number recorded in the area ETN of the pre-grooves on both sides of that track.

Figure 5:
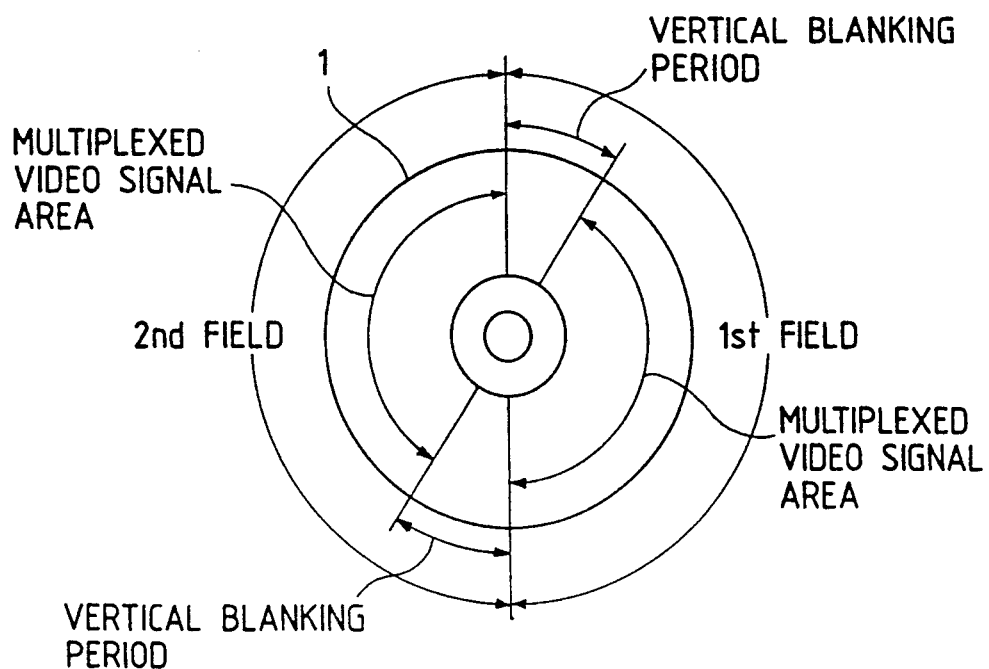
FIG. 5 shows recording areas of respective signals on the optical disc.

A digital signal carrying a video signal and a PCM audio signal is recorded on the disc 1. As shown in FIG. 5, a video signal of one frame that consists of first and second fields is recorded in each track of the disc 1, and PCM audio data is recorded so as to be inserted in the vertical blanking period of the video signal. This recording method is described below.

An analog video signal consisting of a luminance signal Y, color difference signals R-Y and B-Y, and a sync signal is converted to a digital video signal by an A/D converter. The digital video format signal is written into a line memory to perform time-axis compression. The luminance signal and the color difference signals are written into the line memory with a write clock of 13.5 and 2.25 MHz, respectively, and read out therefrom with the same read clock of 16.2 MHz. As a result, the luminance signal is compressed at a ratio 13.5/16.2, i.e., 1/1.2, and the color difference signals at a ratio of 2.25/16.2, i..e., 1/7.2. These three signals thus compressed are subjected to time-axis multiplexing to be combined into one multiplexed video signal.

The multiplexed video signal as output from the line memory is provided to a digital filter for eliminating folded noise, and then written into a frame (or field) memory, which performs a timing adjustment (i.e., sync adjustment) between the input multiplexed video signal and a multiplexed video signal to be recorded on the disc 1. The multiplexed video signal is read out from the frame memory in accordance with a 16.2-MHz sync clock of the recording mode, and converted to an analog multiplexed video signal, which is recorded on the tracks, i.e., land portions 3 (see FIG. 1) after subjected to frequency modulation.

Figure 6:
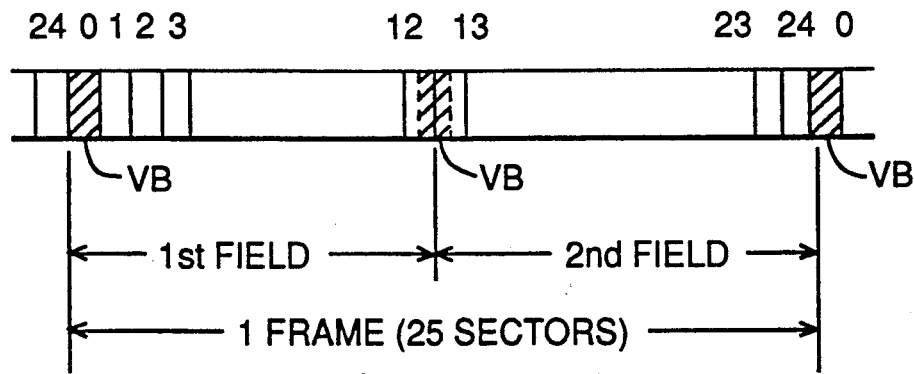
FIGS. 6(a)–6(c) shows a recording format of a multiplexed video signal and a PCM audio signal.
Figure 6:
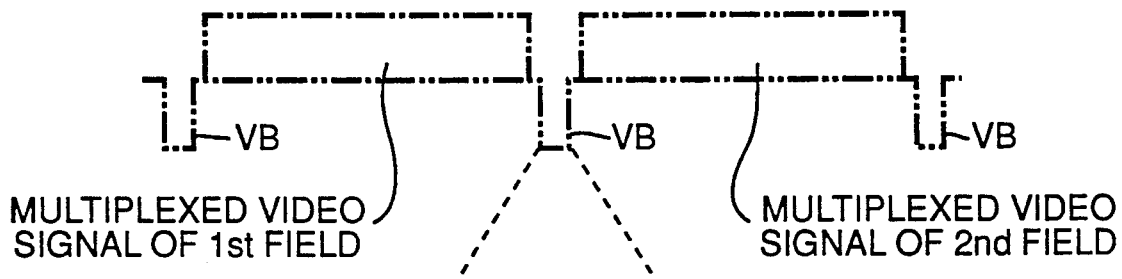
Figure 6:
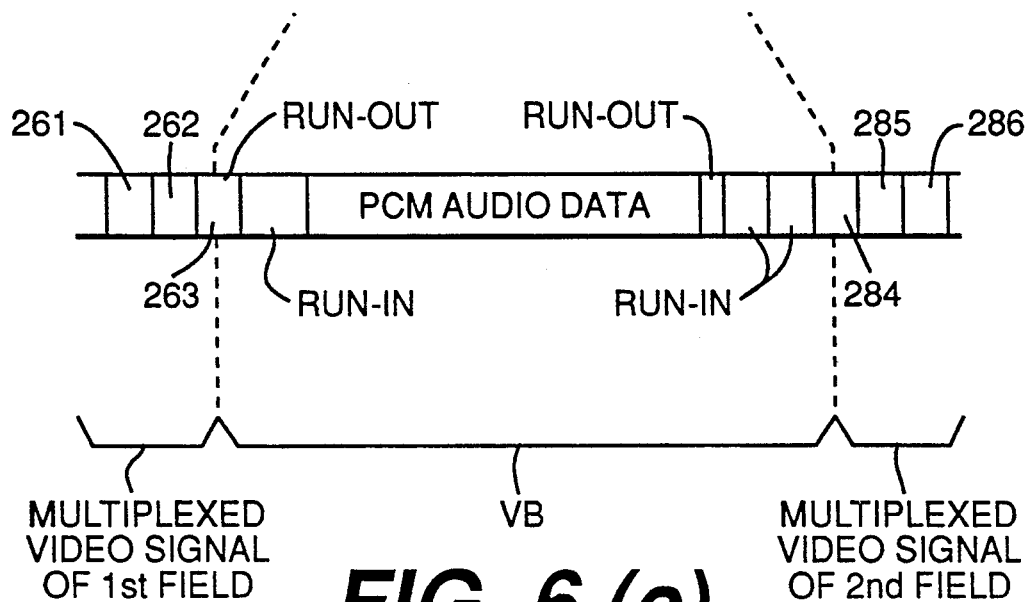

As shown in part (a) of FIG. 6, one frame is divided into 25 sectors, i.e., sector 0 through sector 24. The first field consists of sector 0 through the center of sector 12, and the second field consists of the center of sector 12 through sector 24. Therefore, one of the vertical blanking period sections VB of each frame is provided in sector 0, and the other is provided so as to be included in both sectors 12 and 13. As shown in part (b) of FIG. 6, the first field of the multiplexed video signal is recorded from sector 1 to the center of sector 12, and the second field is recorded from the center of sector 13 to sector 24.

As shown in part (c) of FIG. 6, the PCM audio data is recorded together with run-in and run-out sync pulses so that they are inserted into the vertical blanking period VB. Further, a time code, which is temporal information of the multiplexed video signal, is recorded in a sync pulse portion of at least 1H line of the vertical blanking period VB. A series of clock pulses for the PLL synchronization is inserted into a sync pulse portion of at least 1H line immediately after the vertical blanking period VB of the input video format signal.

The time code which has been biphase-modulated using a clock that is in phase with this clock signal is superimposed. In the case where the time code is not superimposed, series of biphase-modulated pulses have constant intervals of inversion, and the PLL synchronization is performed using these pulses.

The above recording method is disclosed in Japanese Patent Application Unexamined Publication No. Hei. 4-172663 filed by the present applicant.

Figure 7:
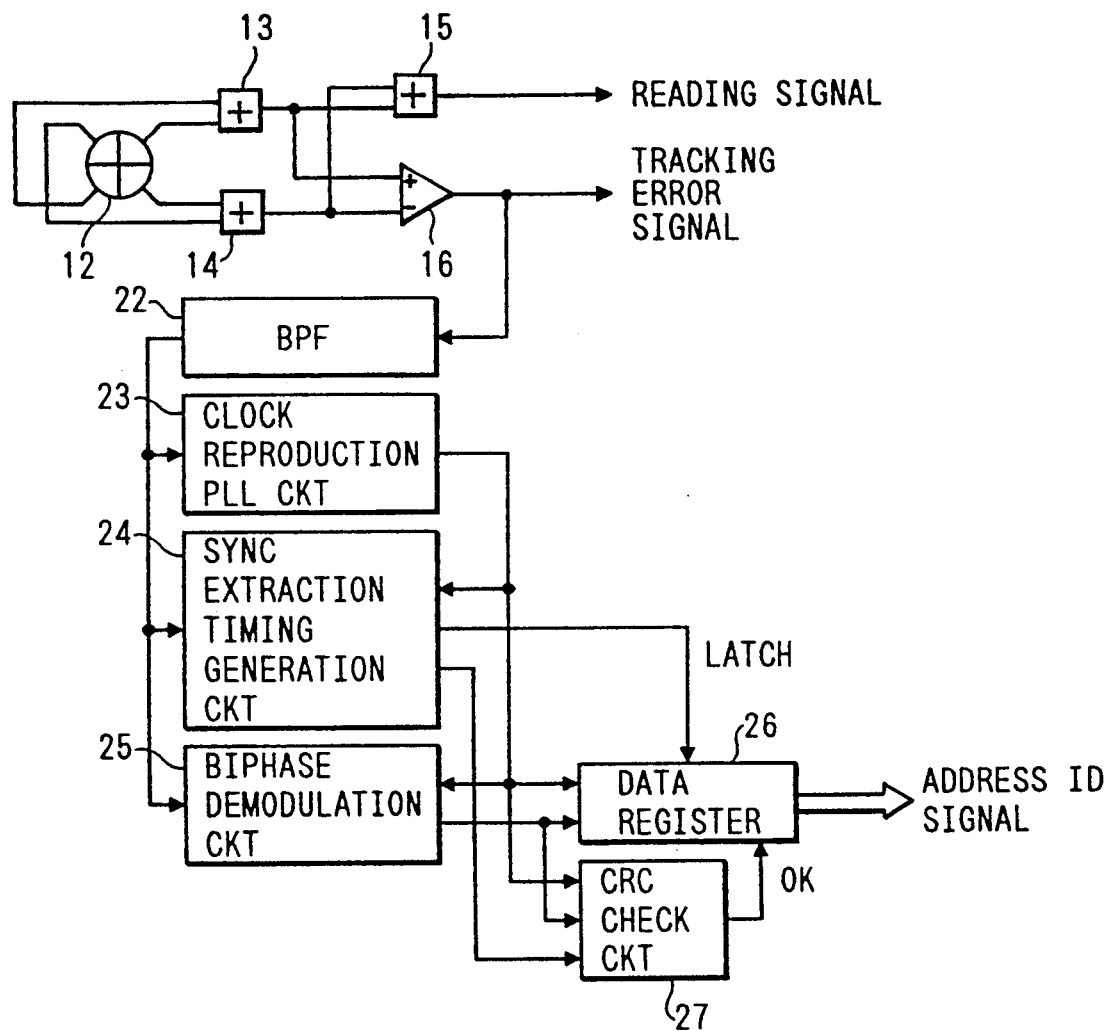
FIG. 7 is a block diagram showing configurations of a recording head and an address decoder of the player of FIG. 1.
Figure 8:
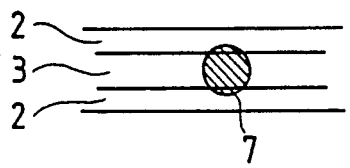
FIG. 8 shows a laser beam spot formed on a land portion of the optical disc.

The disc player of FIG. 1 has two heads 11A and 11B for reading information recorded on the disc 1, which heads are separated from each other by 180°. As shown in FIG. 7, the head 11A has a 4-segmented photodetector 12, adders 13-15 and a differential amplifier 16. The adder 15 produces a signal representing a sum of all the outputs of the 4-segmented photodetector 12 which receives a laser beam that is emitted from a laser (not shown) and reflected by the disc 1. The output signal of the adder 15 serves as a reading signal in the reproducing operation. A signal representing a difference between two addition signals from the adders 13 and 14 is produced by the differential amplifier 16, and serves as a tracking error signal. The head 11B has a configuration similar to that of the head 11A. As shown in FIG. 8, a spot 7 that is formed by the laser beam incident on the land portion 3 of the disc 1 has a diameter larger than the width of the land portion 3.

Returning to FIG. 1, the respective reading signals from the heads 11A and 11B are provided not only to a video demodulation circuit 18 after being selected by a switch 17, but to a PCM audio demodulation circuit 20 after being selected by a switch 19. The changeover operation of the switches 17 and 19 is controlled by a controller 36 (described later). Normally, the switches 17 and 19 select the output of the head 11A.

The tracking error signal output from the head 11A is provided to a servo circuit 21, which produces a control signal in accordance with the tracking signal to control the movement of the head 11A in the disc radial direction. The tracking error signal is also provided to a BPF (bandpass filter) 22, which extracts the wobble signal having predetermined frequency components, i.e., the address identification signal from the tracking error signal. As shown in FIG. 7, an output signal of the BPF 22 is provided to a clock reproduction PLL circuit 23, a sync extraction timing generation circuit 24 and a biphase demodulation circuit 25. The biphase demodulation circuit 25 produces the above-mentioned sector number and track number, which are provided to a data register 26 and a CRC check circuit 27. Whether the track number is correct or not is judged based on the error detection code data that is provided to the CRC check circuit 27 following the track number. The sync extraction timing generation circuit 24, biphase demodulation circuit 25, data register 26 and CRC check circuit 27 constitute an address decoder 28 of FIG. 1.

The tracking error signal output from the head 11B is provided to a servo circuit 29 and a BPF 30. A clock reproduction PLL circuit 31 and an address decoder 32 are connected to the BPF 30, which configuration is similar to the case of the head 11A.

Clock pulses from the clock reproduction PLL circuit 23 and an address identification signal from the address decoder 28 are provided to a microcomputer 33. The microcomputer 33 is constituted, in what is called a software-like manner, of a vertical blanking period detection circuit 34 for detecting the vertical blanking period and generating a reset pulse, a counter 35 for counting the clock pulses from an initial value in response to the reset pulse, and a controller 36 for performing a control operation. Reading the address identification signals from the address decoders 28 and 32 and the count value of the counter 33, the controller 36 provides a jump instruction signal to the servo circuits 21 and 29 in accordance with the operation of a keyboard 37, as described later.

Figure 9:
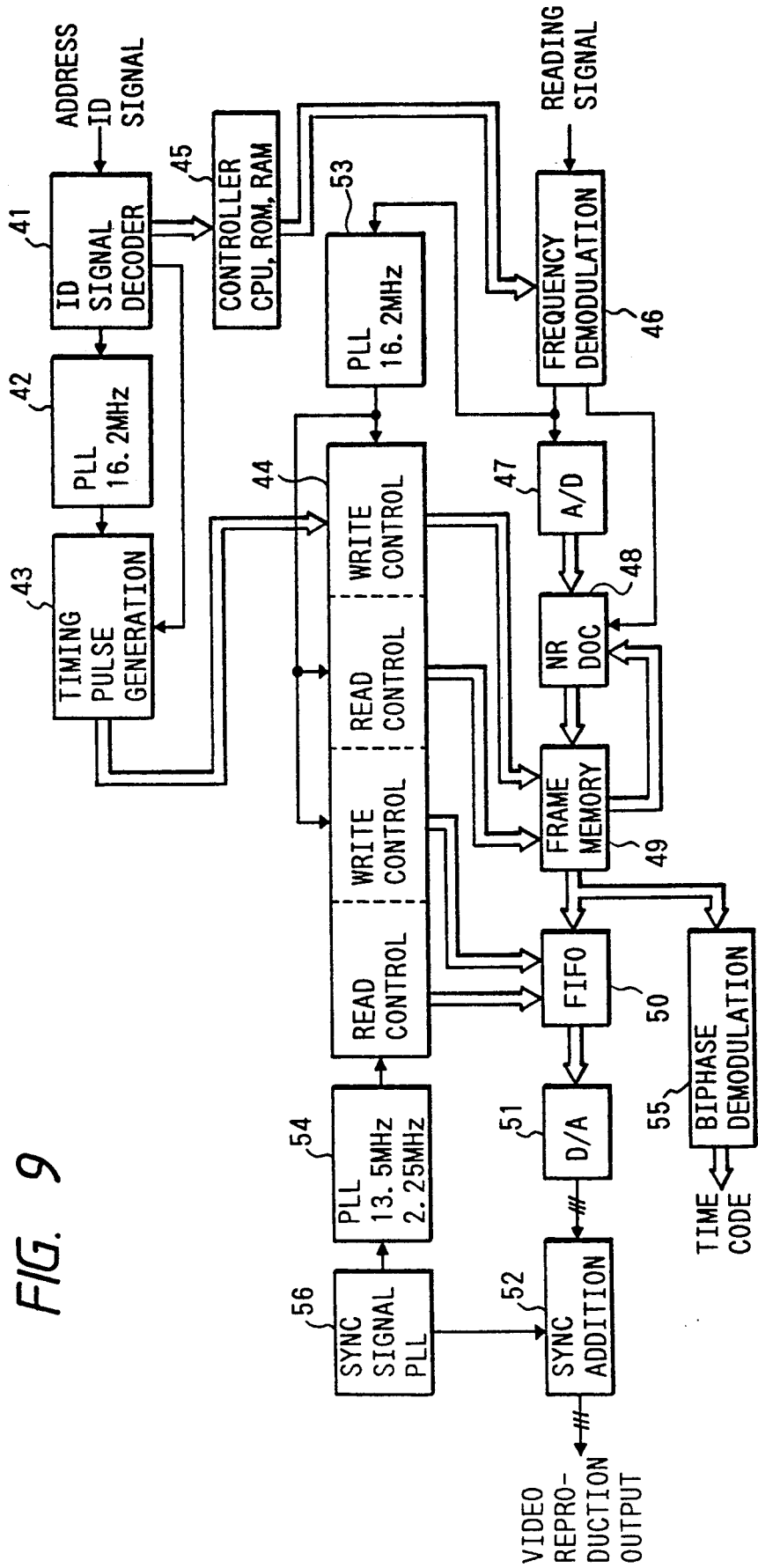
FIG. 9 is a block diagram showing a detailed configuration of a video demodulation circuit of the player of FIG. 1.

In the video demodulation circuit 18 (see FIG. 9), the address identification signal, that has been picked up from the pre-grooves 2, is provided to an identification signal decoder 41 via the controller 36. Receiving the clock pulses of the area CP (see FIG. 3) or sector sync pulses, which are included in the address identification signal, from the identification signal decoder 41, a PLL circuit 42 provides a 16.2-MHz sync clock to a timing pulse generation circuit 43. In accordance with timing pulses sent from the timing pulse generation circuit 43, a read/write control circuit 44 performs control of writing into a frame memory 49 (described later). Receiving the track number, sector number and other information from the identification signal decoder 41, a controller 45 having a CPU, ROM, RAM, etc. controls the reproducing operation. The controller 45 may be constituted of a microcomputer 33.

The reading signal as produced is amplified to a necessary level, and the FM video signal of the reading signal, on which the time code is superimposed, is provided to a frequency demodulation circuit 46, where it is converted to an analog multiplexed video signal. The analog multiplexed video signal is digitized by an A/D conversion circuit 47, and provided to a dropout compensation circuit 48. The dropout-compensated multiplexed video signal is written into the frame memory 49. The multiplexed video signal, which has been subjected to a time-axis adjustment by the frame memory 49, is then expanded in the time axis by a FIFO 50 in a manner reverse to the manner of the recording operation. Thus, a reproduction video signal is produced. The read/write control circuit 44 performs read and write control on the frame memory 49 and FIFO 50 in accordance with output clocks of PLL circuits 53 and 54. The output clock of the PLL circuit 54 is generated based on output pulses from a sync signal PLL circuit 56. A sync addition circuit 52 adds a sync signal to the reproduction video signal that has been converted to an analog signal by a D/A conversion circuit 51. Modulated clock pulses included in the multiplexed video signal as output from the frame memory 49 are demodulated by a biphase demodulation circuit 55 to restore the original time code.

The track number and other information obtained from the address identification signal in the reading operation are provided from the identification signal decoder 41 to the controller 45, where it is used for the control operations in the reproduction mode.

In the following, the operation of the microcomputer 33 is described with reference to FIG. 10 taking, as an example, a case in which it receives an N-fold-speed reproduction instruction through the keyboard 37.

Upon receiving the n-fold-reproduction instruction from the keyboard 37, the microcomputer 33 first sets, in accordance with the received instruction, the number of tracks to be jumped (step S1). For example, this number is two in the case of triple-speed reproduction. After execution of step S1, it is judged whether a vertical blanking period has been detected (step S2). This operation corresponds to the vertical blanking period detection circuit 34 (see FIG. 1). Upon detection of the vertical blanking period, the switch 19 is changed over to the side of the head 11B (step S3), and the counter 35 is reset (step S4). Due to the selection of the head 11B by the switch 19, the reading signal of the head 11B is provided to the PCM audio demodulation circuit 20, which in response produces an audio signal. Then, the microcomputer 33 judges based on the count value of the counter 35 whether a predetermined time t has elapsed from the detection of the vertical blanking period (step S5). The time t is a time period which the reading position of the head 11B needs, from the detection of the beginning of the vertical blanking period, to reach the center of the vertical blanking period. After the lapse of the time t, the microcomputer 33 produces a jump instruction signal to activate a jump operation to move the head 11A by the number of tracks as set above (step S6). This jump instruction signal is provided to the servo circuit 21, which produces a pulse signal in accordance with the jump instruction signal. A tracking actuator (not shown) of the head 11A is driven by this pulse signal to make the reading position of the head 11A jump in the disc radial direction toward the outside. For example, the tracking actuator consists of a coil and a tracking mirror that is rotationally driven by the coil.

After the generation of the jump instruction signal, the microcomputer 33 judges from the count value of the counter 35 whether a time $t+\alpha$ has elapsed from the detection of the vertical blanking period (step S7) The time $\alpha$ is, for instance, 2 msec, which is a little longer than a time necessary for the head 11B to read the PCM audio data. After the lapse of the time $t+\alpha$, another jump instruction signal is produced to make the head 11B jump by the number of tracks as set above (step S8). This jump instruction is provided to the servo circuit 29, which produces a pulse signal in accordance with this jump instruction. A tracking actuator (not shown) of the head 11B is driven by this pulse signal to make the reading position of the head 11B jump in the disc radial direction.

After execution of step S8, it is judged whether the N-fold-speed reproduction instruction is still provided continuously by the operation of the keyboard 37 (step S9). If the judgment is affirmative, the process returns to step S1 to repeat the above operation. That is, the head 11A reads the recorded information of the track and the video reproduction is performed in accordance with the reading signal until the reading position of the head 11A reaches the vertical blanking period section. After the reading position of the head 11A reaches the vertical blanking period section, the head 11B reads the PCM audio data in the vertical blanking period and provides the readout data to the PCM audio demodulation circuit 20. After the lapse of the time t from reaching the vertical blanking period section, the reading position of the head 11B jumps in the disc radial direction, and after the further lapse of the time $\alpha$, the reading position of the head 11B jumps in the disc radial direction. Where the number N representing the reproduction speed can be varied consecutively by the operation of the keyboard 37, the number of tracks to be jumped is set in step S1 in accordance with the N-fold-speed reproduction instruction at each time and, therefore, the jump amount is varied accordingly.

If, on the other hand, the N-fold-speed reproduction instruction is not provided any more in step S9, it is judged whether a vertical blanking period has been detected (step S10), which is a judgment similar to the judgment in step S2. If the judgment is affirmative, the switch 19 is changed over to the side of the head 11A (step S11). Due to the selection of the head 11A by the switch 19, the reading signal of the head 11A is provided not only to the video demodulation circuit 18 but to the PCM audio demodulation circuit 20, so that video and audio signals are produced in accordance with the reading signal of the head 11A.

After execution of step S12, the microcomputer 33 judges whether the addresses of the reading positions of the heads 11A and 11B are identical or not (step S12). This judgment is performed based on the respective address identification signals produced by the address decoders 28 and 32. If the addresses of the reading positions of the heads 11A and 11B are identical in the same track, the execution of this routine is finished. On the other hand, if they are not identical, a difference between those addresses is calculated, the number of tracks to be jumped is set (step S13), and a jump instruction signal is generated to make the head 11B jump by the number of tracks thus set (step S14). After execution of step S14, the process returns to step S12. This loop is repeated until the addresses of the reading positions of the heads 11A and 11B become equal to each other.

In the video signal reproducing system, a delay of two fields is caused by the writing and reading operations on the frame memory 49. On the other hand, in the audio signal reproducing system, only one-field time is required for the PCM demodulation. Therefore, a one-field delay circuit is provided in the audio signal reproducing system. However, where the audio signal is reproduced from the reading signal of the head 11B as in the above case, if there exists such a relationship that the reading position of the head 11A leads that of the head 11B by one field, in the audio signal reproducing system the audio signal is reproduced and output without passing through the one-field delay circuit.

Although the N-fold-speed reproduction is described in the above embodiment, a similar operation is performed in their special operation modes, such as the pause operation, which require the jump operation.

According to the invention, the jump operation is performed in the following manner. The reading position of the first one of the two reading heads jumps when it is located in the vertical blanking period section, and the reading position of the second reading head jumps when it is located outside the PCM audio data portion of the vertical blanking period section. The reading signal obtained from the first reading head by reading the sections other than the vertical blanking period section is subjected to the video reproduction process. The reading signal obtained from the second reading head by reading the vertical blanking period section is subjected to the audio reproduction process. Therefore, during such operation modes as the pause operation and double-speed reproduction that need the jump operation, both of the video and PCM audio signals can be reproduced at the same time. This will particularly facilitate video editing operations.

What is claimed is:

1. An information reading and reproducing method in a video disc player having first and second recording heads, for reading and reproducing a video signal and a PCM audio signal that is recorded in a predetermined portion of a vertical blanking period section of a video disc in an operation mode accompanied by a jump operation, comprising the steps of:

having a reading position of the first recording head jump when it is located in the vertical blanking period section, and employing, as a video reading signal, an output of the first reading head that is produced by reading sections of the video disc other than the vertical blanking period section; and having a reading position of the second recording head jump when it is located outside the predetermined portion of the vertical blanking period section, and employing, as an audio reading signal, an output of the second reading head that is produced by reading the vertical blanking period section.

2. The information reading and reproducing method of claim 1, comprising the steps of:

starting to employ the output of the second reading head as the audio reading signal from a first time point when the reading position of the first reading head reaches a beginning of the vertical blanking period section;

having the reading position of the first reading head jump when a first predetermined time has elapsed from the first time point; and having the reading position of the second reading head jump when a second predetermined time that is longer than the first predetermined time has elapsed from the first time point.

* * * * *